June 21, 1966
H. J. GERBER
3,257,291
MEANS FOR DESALTING SEA WATER BY SOLAR HEAT
AND AIR CONVECTION
Filed Feb. 5, 1962
6 Sheets-Sheet 1
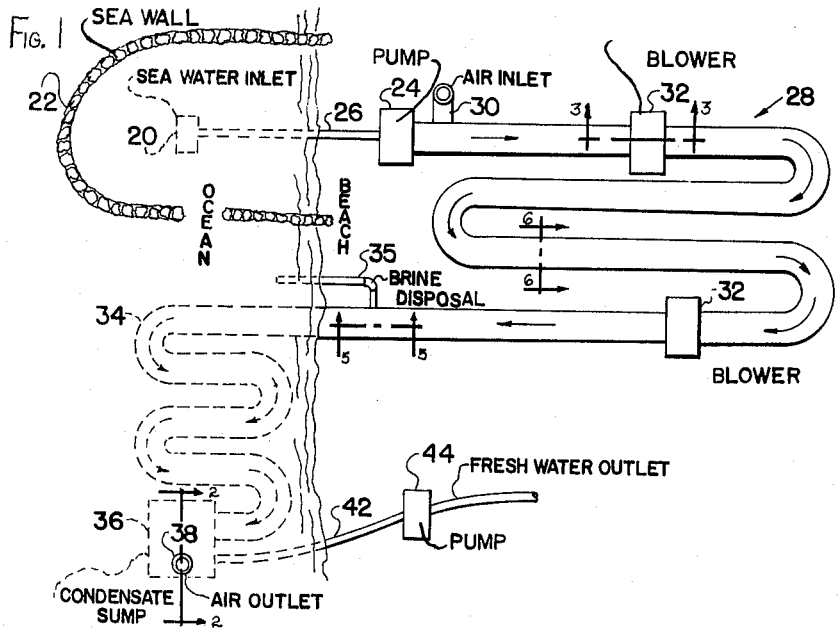
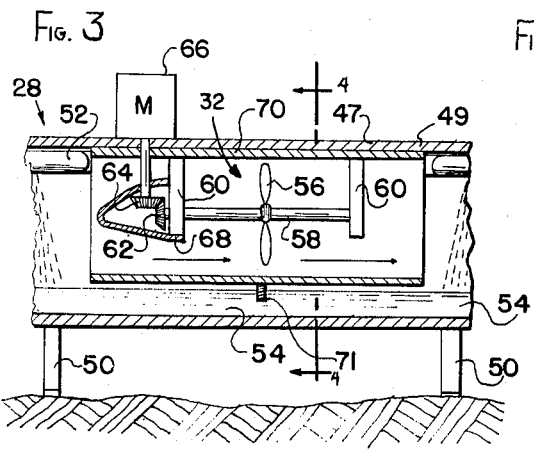
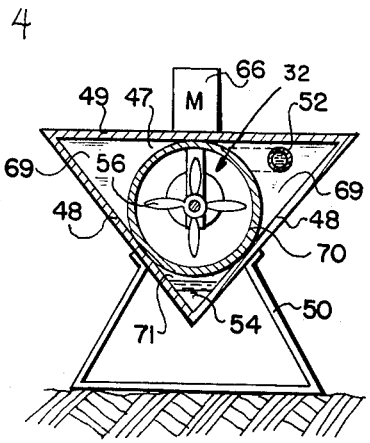
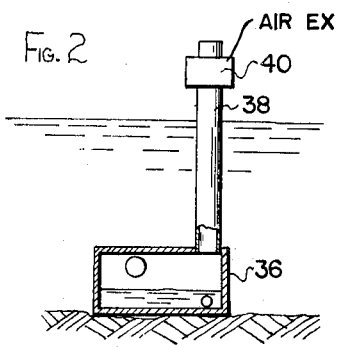
INVENTOR.
HEINZ JOSEPH GERBER
BY *Teller, McCormick, Paulding & Huber*
ATTORNEYS

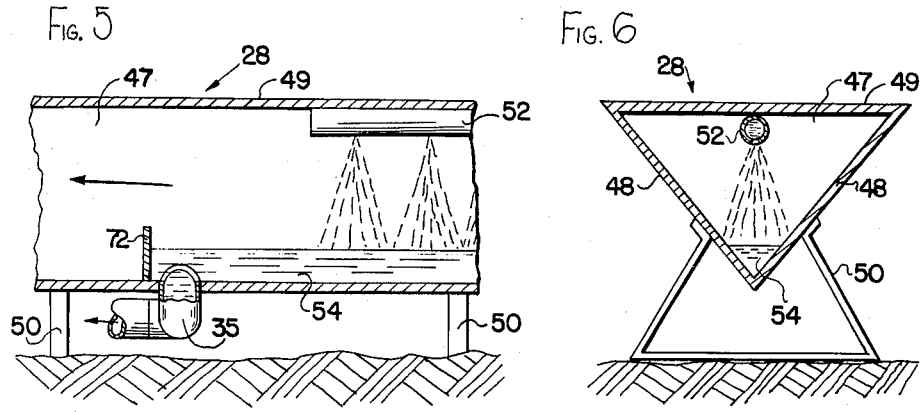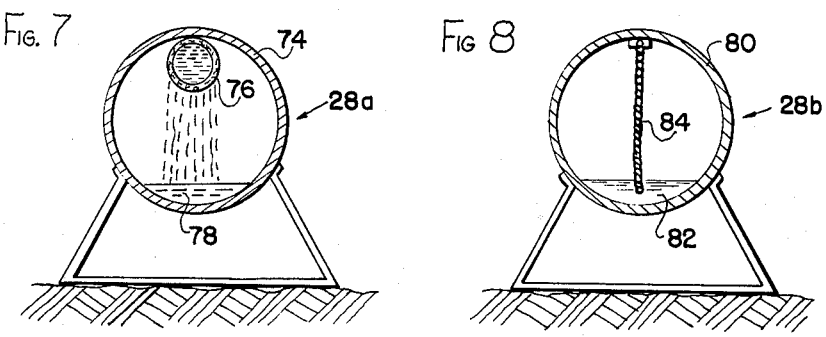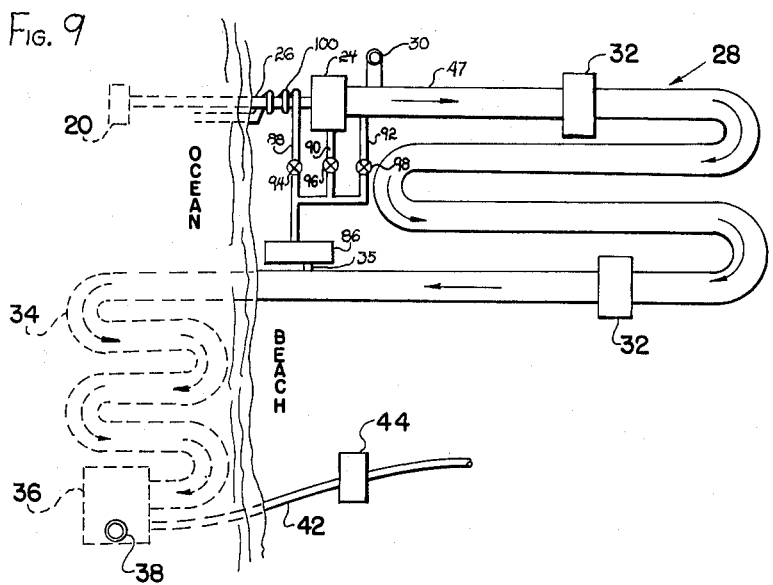

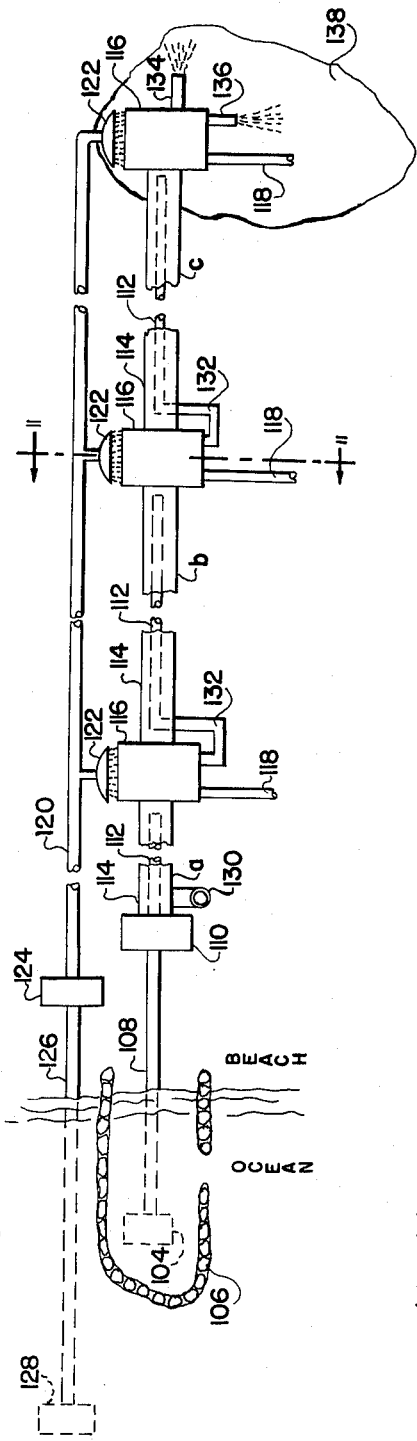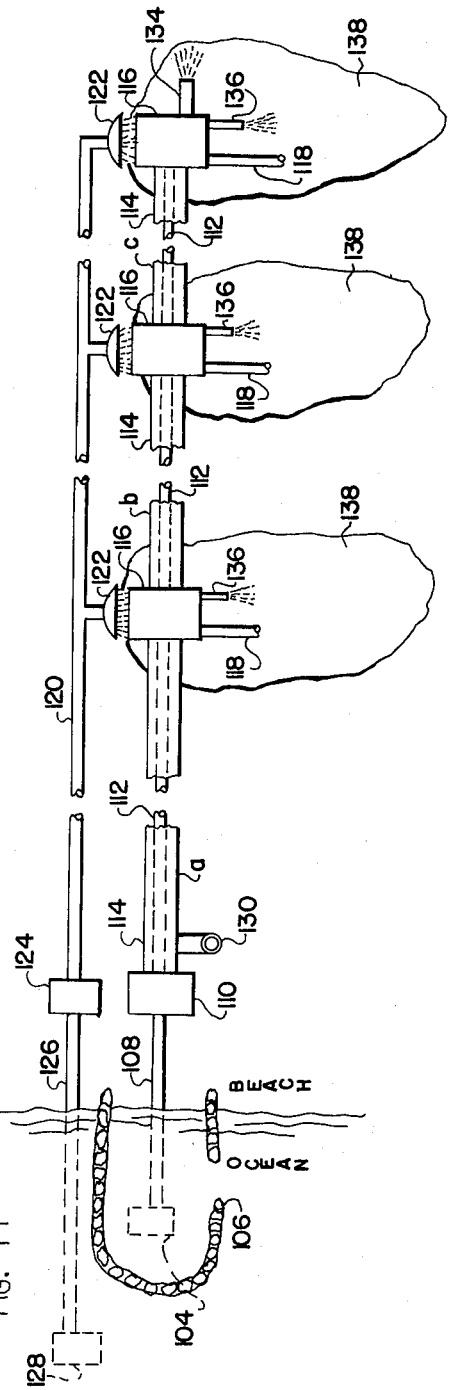

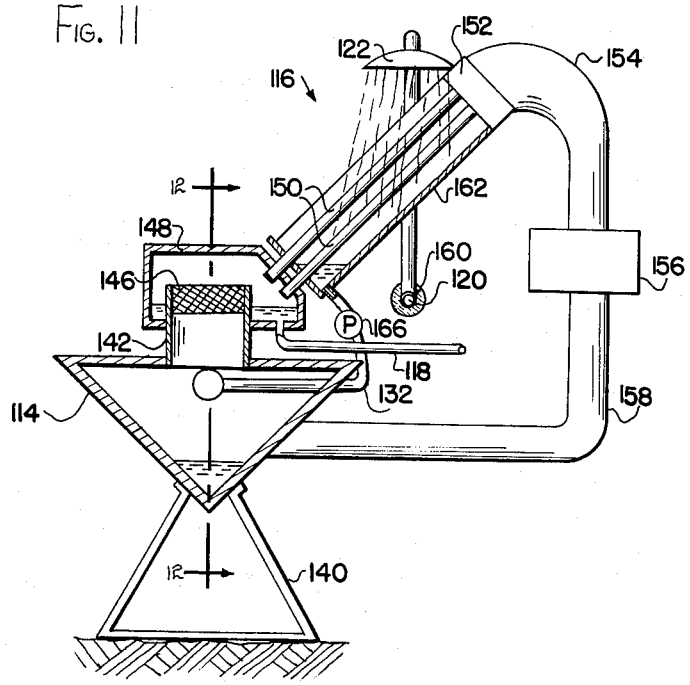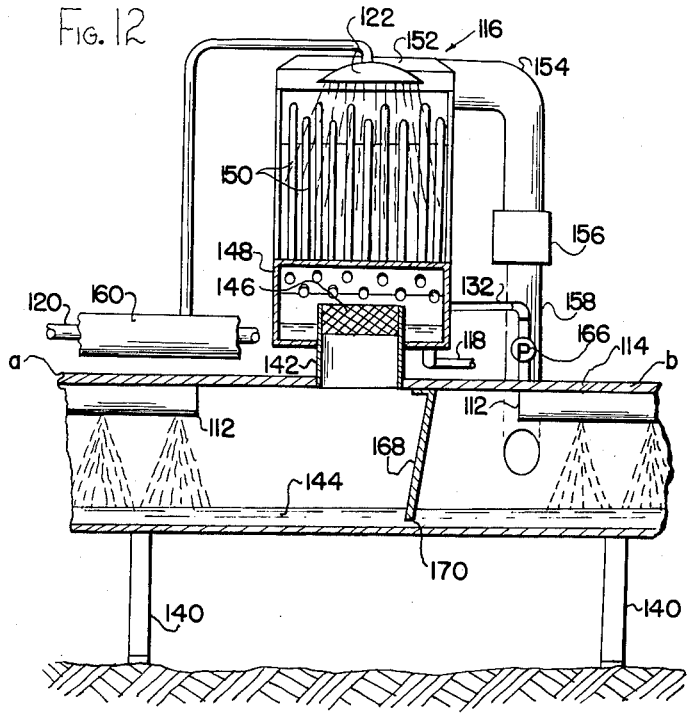

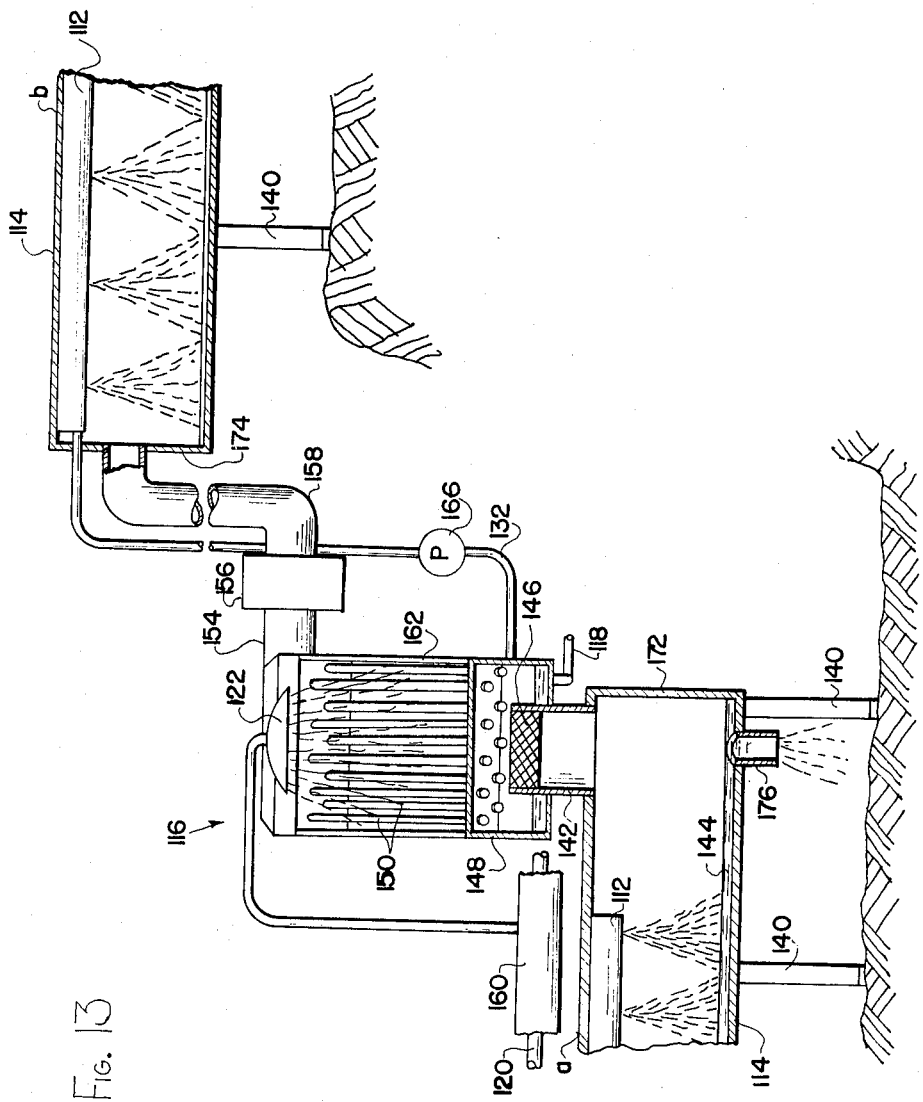

United States Patent Office 3,257,291
Patented June 21, 1966

3,257,291
MEANS FOR DESALTING SEA WATER BY SOLAR HEAT AND AIR CONVECTION
Heinz Joseph Gerber, West Hartford, Conn., assignor to The Gerber Scientific Instrument Company, Inc., South Windsor, Conn., a corporation of Connecticut
Filed Feb. 5, 1962, Ser. No. 170,933
7 Claims. (Cl. 202—234)

This invention relates to a novel method and means for converting sea water, brackish water or other contaminated water into fresh water suitable for drinking, irrigation or other purposes to which fresh water is normally put, and deals more particularly with such a method and means utilizing solar energy as a heat source to effect evaporation and naturally available heat sinks to effect condensation during the conversion process.

In the past it has been known to convert sea water to fresh water by evaporating sea water and condensing the evaporated product to produce a condensate free of salt and other contaminants, and it has also been known to effect the evaporation by the utilization of solar energy. Prior apparatus and methods incorporating the evaporation and condensation principle have, however, not proved entirely satisfactory in regard to the cost per gallon of fresh water produced based on the operating and equipment costs. This is particularly so in regard to prior systems using solar energy. These systems generally have involved the use of relatively expensive apparatus having relatively low efficiencies and small capabilities, and accordingly have been unable to produce large quantities of fresh water at a reasonable cost so as to make the system feasible for producing anything other than drinking water where cost is not an important factor. One common reason for the low efficiency and small capacity of prior solar systems has been the practice of attempting to combine the evaporating and condensing functions into a single unit or "still" and in which it is difficult to maintain a high temperature differential between the evaporating and condensing areas.

The general object of this invention is to provide a desalination process and system capable of producing large quantities of fresh water at a very low cost per gallon so that the fresh water may be used not only for drinking but for irrigation and other purposes requiring large amounts of low cost water. In keeping with this general object it is a more specific object to provide a desalination process and system utilizing solar energy as a source of heat for effecting evaporation of the sea water and cool sea water or another natural heat sink for condensing the vapor formed in the evaporation process, and which process and system require only minor additional amounts of power for pumping and the like so that the operating costs per gallon of fresh water are minimized.

Another object of this invention is to provide a process and system of the character mentioned in the last paragraph and wherein the evaporating and condensing functions are carried out in different parts of the system so that a maximum temperature differential may be maintained between said different parts to provide a high operating efficiency.

Another object of this invention is to provide a solar energy desalination system including a novel elongated evaporator which may be either folded upon itself in serpentine fashion so as to occupy a limited area at a given site or which may be extended a considerable distance inland from the sea water source and serve additionally as a conduit for delivering the fresh water to the areas to be served.

Another object of this invention is to provide a solar energy desalination system particularly adapted for use on the beach or shore of an ocean or sea and which makes maximum use of the high daytime temperatures prevailing on the beach and the cool temperatures prevailing in the ocean.

A further object of this invention is to provide a solar desalination system in which sea water or brine which has passed through the evaporator and has been heated to a relatively high temperature but not evaporated may be recirculated through the evaporator or used regeneratively to preheat the incoming sea water.

Another object of this invention is to provide a solar desalination system including an elongated evaporator extending inland from the sea water source and having a number of condensers at spaced points along its length for withdrawing vapor and condensing the same to produce fresh water for a particular area or facility served by the condenser.

Other objects and advantages of the invention will be apparent during the course of the following description and from the drawings forming a part hereof.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a schematic illustration of a desalination system embodying the present invention.

FIG. 2 is a vertical sectional view taken through the condenser sump of the FIG. 1 system and taken on the line 2—2 of FIG. 1.

FIG. 3 is a vertical sectional view taken on the line 3—3 of FIG. 1 and illustrating the construction of a blower employed in the FIG. 1 system.

FIG. 4 is a transverse vertical sectional view taken on the line 4—4 of FIG. 3 and showing further details of the construction of the blower shown in FIG. 3.

FIG. 5 is a vertical sectional view taken on the line 5—5 of FIG. 1 and showing the interior construction of the evaporator at the discharge end thereof.

FIG. 6 is a transverse vertical sectional view taken on the line 6—6 of FIG. 1 and illustrates a typical cross-section of the evaporator.

FIG. 7 is a view similar to FIG. 6 but shows an alternative form of evaporator.

FIG. 8 is a view similar to FIG. 6 but shows another alternative form of evaporator.

FIG. 9 is a schematic illustration of a desalination system comprising another embodiment of the present invention.

FIG. 10 is a schematic illustration of a desalination system comprising a third embodiment of the present invention.

FIG. 11 is a transverse vertical sectional view taken on the line 11—11 of FIG. 10 and illustrates the construction of one of the condensers in said system.

FIG. 12 is a longitudinal vertical sectional view taken on the line 12—12 of FIG. 11.

FIG. 13 is a view similar to FIG. 12 but illustrates a construction of the evaporator and condenser permitting a change in elevation of the evaporator.

FIG. 14 is a schematic illustration of a desalination system comprising a fourth embodiment of the present invention.

Figure 15:
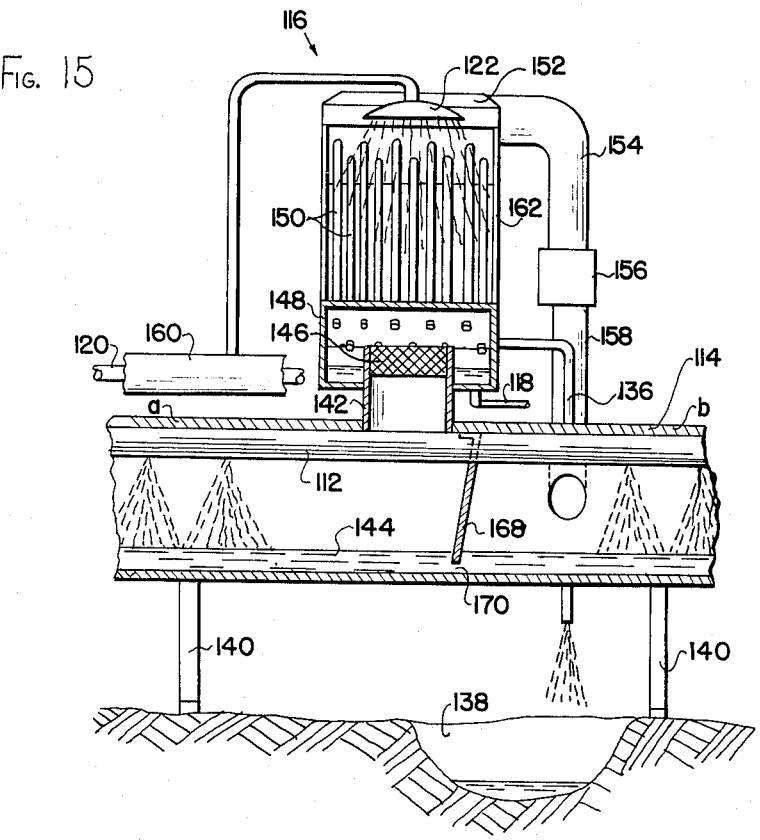
FIG. 15 is a longitudinal vertical sectional view taken on the line 15—15 of FIG. 14 and illustrates the construction of a condenser used in said system.

*Desalination system of FIGS. 1 to 8*

Turning now to the drawings, FIGS. 1 through 8, inclusive, show a desalination system embodying the process and apparatus of the present invention. FIG. 1 shows the complete system, and referring to this figure it will be noted that the system is situated along the shore of an ocean with part of the system being located on the shore or beach and with another part of the system being located in the ocean. The beach is located at the right-hand portion of the figure and the ocean at the left-hand portion of the figure. In this case the ocean constitutes the source of sea water to be converted by the system, but it is to be understood that this has been done by way of example only and that the system may be used as well in connection with other different bodies of water.

In the operation of the system shown in FIG. 1 sea water is taken from the ocean through a suitable inlet 20 located some distance offshore. This inlet may be placed offshore in the main body of the ocean, but preferably is located in a prewarming basin or pool containing relatively still or stagnate water which is heated by the sun to a temperature somewhat above that of the main body of the ocean. Depending on the topography of the site, the pre-warming basin may be a natural pool, cove or the like, but where such natural features are unavailable an artificial pool or basin may be used. In FIG. 1, for example, such an artificial pool is formed by a wall 22 extending from the beach out into the ocean and surrounding the inlet. A more effective, but more costly, warming basin could also be built onshore and provided with a blackened flat bottom of considerable area for warming, by solar energy, a relatively shallow layer of sea water withdrawn from the ocean by a separate pump; and for maximum efficiency this basin could be covered with a transparent cover of glass or the like to reduce thermal losses.

Sea water entering the inlet 20 is drawn therefrom by a pump 24 through a conduit 26 and the discharge from the pump enters an evaporator indicated generally at 28. This evaporator comprises a hollow elongated body of considerable length which in the illustrated system is shown to be folded upon itself in serpentine fashion to occupy a given area of the site and to be confined within reasonable bounds. In the illustrated system, the evaporator is shown folded to produce a total of four parallel passes, but this number of passes is exemplary only and the system could include many such passes in order to provide a higher capacity.

In addition to the sea water supplied by the pump 24, the evaporator 28 is also supplied with air which enters through an inlet such as indicated at 30. In the evaporator this air is brought into direct contact with the sea water, and the sea water, air and the body of the evaporator are heated by solar radiation to cause a portion of the sea water to evaporate into the air contained in the evaporator. Where the evaporator is located on a sandy beach the reflection of the sun rays from the sand will aid in heating the evaporator, or as an alternative suitable artificial reflectors (not shown) may be used for the same purpose. As the air moves through the evaporator it picks up more and more water vapor due to the evaporation taking place, and the air is forcibly moved through the evaporator at a desirable rate by suitable means such as one or more blowers 32, 32 located at spaced points along its length.

When the humidified air reaches the end of the evaporator 28 it is separated from the unevaporated sea water or brine and conducted to a condenser 34, and the unevaporated sea water is returned to the ocean through a disposal line 35. The condenser 34 is located in the ocean so as to be cooled thereby, and although FIG. 1 shows it to be located relatively close to the beach, this has been done for convenience of illustration only and it is to be understood that the condenser may be, and is preferably, located a considerable distance offshore where the temperature of the ocean water is generally cooler than it is along the beach.

The condenser 34 may take various suitable forms and in the illustrated case is shown to comprise a serpentine tube terminating at a condensate sump 36. The tubing comprising the condenser 34 is inclined to the horizontal along its entire length with the inlet being at a higher elevation than the outlet so that the condensate or fresh water formed therein will drain into the sump 36. The sump 36 is, of course, also located below the surface of the ocean. The air entering the condenser 34 flows into the sump 36 and is vented therefrom by a suitable air outlet 38 which is or may be a pipe extending vertically from the sump to a point above the ocean surface. Where necessary to aid in moving the air through the condenser 34 an exhaust fan may be mounted at or near the top of the air outlet 38. FIG. 1 illustrates the air outlet without such an exhaust fan while FIG. 2 shows such a fan at 40. If desired, the outlet 38 may be connected to the inlet 30 by means of a suitable conduit so that the air leaving the outlet is recirculated through the evaporator.

Condensate or fresh water collecting in the condensate sump 36 is drawn therefrom through a conduit 42 by a pump 44 which discharges into a suitable fresh water outlet line for carrying the fresh water to a suitable storage or delivery facility.

The evaporator shown in the system of FIG. 1 may take various different forms and consists primarily of means for contacting in an efficient manner the sea water supplied by the pump 24 with the air introduced through the inlet 30 and for absorbing solar energy and transferring the same to the air and water to promote evaporation. An exemplary form of evaporator is shown in FIGS. 3 to 6 and referring first to FIG. 6 which shows a typical cross section through the evaporator it will be noted that the evaporator comprises a main hollow body 47 shaped in the form of an inverted triangle with two inclined side walls 48, 48 and a horizontal top wall 49. This main body 47 is supported by suitable means such as brackets 50, 50 located at spaced points along its length and these brackets are so arranged that the main body 48 is inclined to the horizontal along its length so that water or brine collecting in the bottom of the body 47 will flow by gravity toward the lower end of the body and the condenser. All three walls of the evaporator may be made of the same material in which case the material is preferably opaque and may be plastic or aluminum. In this case its entire outer surface is preferably colored black or some other dark color to provide for maximum absorption of direct or reflected rays from the sun, and where the body is made of aluminum the black colored outer surface may be provided by an anodizing process. Also, in some cases it may be desirable and more efficient to make the two side walls of an opaque material and the top wall 49 of glass or some other transparent material so that the sun's rays may pass directly into the interior of the evaporator. In this case the inside as well as the outer surface of the side walls 48 is preferably colored black for maximum energy absorption.

Inside the evaporator body 47 and positioned directly below the top wall 49 so as to be spaced some distance above the bottom of the body is a sea water pipe 52 which runs longitudinally of the evaporator and is supplied with sea water from the pump 24. That is, the discharge from the pump 24 or other source enters the sea water pipe 52 rather than entering directly the interior of the body 48. The pipe 52 is of such a nature that the water contained therein may pass through the wall thereof and fall through the body of the evaporator to the bottom thereof. In the embodiment shown in FIGS. 5 and 6 the pipe is an otherwise watertight pipe provided with small openings or orifices at spaced intervals along substantially its entire length through which openings sea water from the pipe is sprayed or dripped into the hollow interior of the body 47. Instead of a generally watertight pipe provided with definite spray or drip openings the pipe may also be made of a porous material so that the sea water will flow through the wall of the pipe and maintain the entire outer surface thereof moist while dripping off the pipe and into the interior of the body 48. Whatever type of sea water pipe is used, it may, if desired, be also provided with an outer coating of absorbent material, such as felt or other cloth, in order to maintain the outer surface in a moistened condition and thereby increase the surface area of water available for contact with the air flowing through the body 47.

Water which does drip or spray from the sea water pipe 52 collects in the bottom of the evaporator body 47 and as will be noted the two inclined side walls of the body form a V-shaped trough for receiving this water which forms a body or stream as indicated at 54. As mentioned previously, the evaporator body 47 is inclined along its length relative to the horizontal so that the body of water 54 flows by gravity toward the condenser. As the sea water sprays or drips from the pipe 52 it falls through the air in the body 47, and this air and water is heated by the solar energy striking the exposed surfaces of the body 47 so that some evaporation takes place as the water so falls or travels through the air. Also, as the stream of water 54 flows through the body 47 it is heated by the side walls of the body so that some evaporation takes place between this body of water and the air passing above it. Accordingly, as the air passes through the evaporator body it picks up more and more water vapor and is in a relatively moist or humid condition by the time it reaches the end of the evaporator.

The blowers indicated at 32, 32 forcibly move air through the evaporator body at such a rate as to prevent the air at any point along the evaporator from becoming fully saturated. These blowers may be of any suitable construction and may be for example of a type such as shown in FIGS. 3 and 4. Referring to these figures the illustrated blower consists of an impeller or fan 56 carried by a shaft 58 supported for rotation within the evaporator body 47 by two depending brackets 60, 60 suitably fixed to the top cover 49. Fixed to one end of the shaft 58 is a bevel gear 62 which meshes with another bevel gear 64 connected to the drive shaft of a motor 66 mounted on the evaporator cover. The gears 62 and 64 are enclosed within a generally conical shield 68 attached to the associated bracket 60. A generally cylindrical shroud 70 surrounds the fan and is generally coaxial with the shaft 58. This shroud guides the air through the fan or impeller 56 and additionally prevents disturbance of the water stream 54. The spaces between the outer surface of the shroud and the walls of the evaporator body are preferably closed by upper plates 69, 69 and a lower plate 71, as shown in FIG. 4, with the lower plate 71 having a lower edge immersed in the stream 54 and spaced some distance from the bottom of the evaporator body to provide an opening for the passage of said stream. Along the length of the shroud 70 the sea water pipe 52 is laterally offset so as to pass along one side of the shroud and along this offset portion the pipe is preferably provided with no openings or the like for permitting water to drip or spray therefrom.

The motors 66, 66 used in the blower units 32, 32 are preferably electric motors, but where necessary for utmost economy the blowers as well as the pumps 24 and 44 may be driven by windmills or other devices using naturally available sources of power to make the system completely nonreliant on electrical or fuel power.

FIG. 5 shows in vertical section the construction of the discharge end of the evaporator 28. Referring to this figure it will be noted that the humidified air is separated from the stream 54 by means of a dam or plate 72 which extends transversely across the bottom of the evaporator body 47 to prevent the stream 54 from passing further downstream of said body. Spaced some distance upstream from the dam 72 is the inlet of the brine disposal pipe 35 which is connected to the bottom of the evaporator body as shown so that the stream 54 drains by gravity from the evaporator. The humidified air in the evaporator body passes over the dam 72 and flows toward the condenser 34 as indicated by the arrow. The sea water pipe 52 terminates some distance upstream from the dam 72 so that all the water sprayed or dripped therefrom has an opportunity to fall into the stream 54 and is not carried over the top of the dam by the air flow.

As mentioned, the structure of the evaporator 28 may take various different forms, and two alternative forms are shown in FIGS. 7 and 8, respectively. In both of these forms the main body of the evaporator 28a or 28b is of circular cross section and formed of an opaque material such as plastic or aluminum and provided with a black or other dark color outer surface for promoting high absorption of solar energy. One advantage of this circular shape is that substantially the same maximum surface area is exposed to the sun throughout the day. In the particular embodiment shown in FIG. 7 the sea water pipe, indicated at 76, is made of a porous material so that the water contained therein will pass through the wall thereof along its entire circumference and maintain the entire outer surface of the pipe in a moist condition and with a result that water collecting on the outside of the pipe will drop into the interior of the body 74 and form a stream 78 in the bottom of the body which flows therealong toward the brine disposal pipe 35. In the embodiment shown in FIG. 8, the sea water from the pump 24 entering the evaporator is introduced directly to the interior of the evaporator body 80 so as to flow along the bottom thereof in a stream 82. This construction eliminates the use of a sea water pipe in the evaporator body and in lieu thereof the evaporator may contain a wick 84 of cloth or other absorbent material extending longitudinally of the evaporator body and fastened along one edge to the upper portion of the body and hanging downwardly through the body so as to have its lower edge immersed in the stream 82. The wick 84 therefore is wetted and provides a moist surface for increasing the area of contact between the water and the air passing through the evaporator.

*Desalination system of FIG. 9*

FIG. 9 shows a system comprising an alternative embodiment of the process and apparatus of the present invention. This system is, or may be, identical with that shown in FIG. 1 with the exception that the brine or sea water leaving the evaporator in the FIG. 9 system is used to regeneratively heat the incoming sea water. This regenerative heating of the incoming sea water may be accomplished either by flowing the withdrawn sea water in heat exchange relationship with the incoming sea water or by mixing a portion of the withdrawn sea water with the incoming sea water so that the resulting mixture entering the evaporator is at a temperature higher than that of the incoming sea water.

In the FIG. 9 system the means for utilizing the withdrawn sea water in either of these two manners is shown to include a pump 86 connected with the brine discharge line 36. The discharge side of the pump is connected to three parallel lines 88, 90, and 92 containing valves 94, 96 and 98, respectively. The line 88 is in turn connected with a heat exchanger 100 associated with the inlet line 26. The line 90 is connected to an inlet of the pump 24, and the line 92 is in communication with the interior of the evaporator body 47. By properly regulating the valves 94, 96 and 98 the discharge from the pump 86 may therefore be selectively directed to either the heat exchanger 100, the pump 24 or the evaporator body 47. The water entering the heat exchanger 100 flows in heat exchange relationship to the incoming sea water to preheat the latter and preferably the heat exchanger is so arranged that the withdrawn water flows therethrough in a direction countercurrent to the incoming sea water. The discharge from the heater 100 is conducted to the ocean as shown. Water entering the pump 24 through the line 90 is mixed with the incoming sea water supplied by the line 26 and the resulting mixture is then conducted to the sea water line 52. Water passing through the line 92 is conducted directly to the interior of the evaporator body and flows by gravity along the bottom thereof and is mixed with the sea water sprayed or dripped from the sea water pipe 52.

*Desalination system of FIGS. 10 to 13*

FIGS. 10 to 13, inclusive, show a desalination system comprising another embodiment of the process and apparatus of the present invention. In this system the evaporator instead of being folded in serpentine fashion and located in a given area on the beach or other site, comprises an essentially straight member which extends a considerable distance inland, or possibly along the beach, from the point at which the water to be processed in drawn from the ocean. Also, instead of passing the humidified air to a condenser located in the ocean, a plurality of condensers are located at spaced points along the length of the evaporator and these are cooled by sea water piped from the ocean or by other heat sinks.

FIG. 10 shows schematically the complete system, and referring to this figure for a more detailed description, water to be desalted is withdrawn from the ocean through a suitable inlet 104 which is supplied with water from the main body of the ocean and which preferably is located within a prewarming pool such as may be formed by the wall indicated at 106. Water is withdrawn from the inlet 104 through a pipe 108 by a pump 110. The discharge from the pump enters a sea water line 112 located within the body of an elongated evaporator 114 which evaporator is or may be of substantially the same construction as the evaporator 28 used in the system of FIG. 1 except for being straight instead of serpentine in shape. The evaporator 114 extends some distance, possibly many miles, inland from the beach. At spaced points along the length of the evaporator 114 are a number of condensers indicated generally at 116 and shown and described in more detail below in connection with FIGS. 11, 12 and 13. At the location of each condenser 116, humidified air is withdrawn from the evaporator and cooled to produce a fresh water condensate taken from each condenser through an associate fresh water pipe 118.

Various different means may be used for cooling each of the condensers 116, 116 and these means may include a mechanically or electrically powered refrigeration system or a heat pump system operating in conjunction with the ground or other naturally available heat sink. Preferably, however, and as shown cooling of the condensers is provided by cool sea water taken from the ocean and conducted to the various condensers by a pipe 120 disposed parallel to the evaporator. To aid in the cooling effect provided by the sea water the condensers 116, 116 preferably are of such construction that the water from the line 120 may be sprayed thereon through spray heads as indicated at 122, 122 so that some cooling by evaporation will take place as the water passes from the spray heads and over the condenser. Although FIG. 10 schematically shows the spray heads 122, 122 discharging sea water horizontally onto the condensers, it will be understood that this has been done for the purpose of illustration only and that the spray heads preferably are arranged to discharge sea water onto the condensers in a generally vertical direction as shown and described in detail hereinafter in connection with FIGS. 11, 12 and 13. The water entering the line 120 is preferably withdrawn from the ocean by a pump 124 through a line 126 communicating with an inlet 128, and preferably the inlet 128 is located a considerable distance offshore so as to be in communication with a relatively cold portion of the ocean water.

In the system shown in FIG. 10, the spaced condensers 116, 116 divided the evaporator 114 into separate longitudinal sections the number of which sections depends on the number of evaporators. In FIG. 10 the system is shown to include three condensers and these three condensers accordingly divide the evaporator 114 into three sections indicated at *a*, *b* and *c*. In the figure the major portion of each section has been omitted for convenience to shorten the length of the figure, but it is to be understood that each section actually is of considerable length and may be as long as several miles. It is also to be understood that the evaporator 114 is disposed above the ground and exposed to the sun's rays so as to be heated thereby and is provided with a black or darkened outer surface to promote maximum absorption of the solar radiation.

In the system shown in FIG. 10, various different arrangements may be employed at the location of each condenser 116 for joining one section of the evaporator 114 to the next adjacent section thereof, and one such means is shown by way of example. In this system air is introduced at the upstream or left-hand end of the first evaporator section *a* through an air inlet 130, and the sea water pipe 112 in this section extends substantially the entire length of the section but terminates short of the first condenser 116. At the first condenser humidified air is withdrawn from the upstream evaporator section *a*, is passed through the condenser 116 and is then returned to the upstream end of the evaporator section *b* for flow toward the next condenser 116. Water which collects in the bottom of the evaporator 114 flows past the condenser 116 from the section *a* to the section *b* of the evaporator. The sea water pipe 112 in the second section *b* of the evaporator is similar to the pipe 112 in the first section *a* and extends substantially the entire length of the section *b* and terminates short of the second evaporator 116. This sea water pipe 112 is connected with an inlet pipe 132 which supplies it with the sea water sprayed on to the condenser 116 from the spray head 122 after such water has passed over the condenser.

The section *c* of the evaporator 114 is substantially the same as the section *b* and is connected to the latter section in the same manner as the latter section is connected to the section *a*. The last or right-hand condenser is similar to the other condensers except that the water which flows along the bottom of the evaporator 114 after passing the last condenser is discharged through a pipe 134 to a suitable waste receiver and the condenser cooling water supplied by the associated spray head 122 is likewise discharged through a pipe 136 to the same waste reiceiver. The waste receiver may take various suitable forms and in the present instance is indicated to comprise a pit 138 formed in the earth below or adjacent the last condenser 116. Water entering this pit will evaporate and the pit may be periodically cleaned of salt and other deposits as often as necessary. In the system shown in FIG. 10 a blower (as shown at 156 in FIGS. 11 and 12) is associated with each condenser for withdrawing the humidified air from the upstream evaporator section, for moving the air through the condenser, and for returning the air to the downstream evaporator section. Although not shown, it is also contemplated that if necessary additional blowers similar to those shown at 32, 32 in the FIG. 1 system may be used in conjunction with the evaporator 114 and between the condensers 116, 116 to keep air moving through the evaporator at a desirable rate. At the last condenser in the system the air withdrawn from the evaporator is discharged to the atmosphere after passing through the condenser.

FIGS. 11 and 12 show the construction of a condenser such as indicated at 116 in FIG. 10 and which condenser is located between two sections *a* and *b* of the evaporator 114 at a point where it is unnecessary to change the elevation of the upstream end of the section *b* relative to the downstream end of the section *a*.

Referring to these figures it will be noted that the evaporator 114 includes a triangular body similar to that of the evaporator 28 in the FIG. 1 system, supported by suitable means such as the brackets 140, 140 in such a manner that the water collecting in the bottom of the evaporator body will flow by gravity in one direction or from left to right in FIG. 12. Air is withdrawn from the downstream end of the evaporator section *a* through an annular chimney 142 connected to the top wall of the evaporator body and extending some distance upwardly therefrom with the bore of the chimney being in communication with the interior of the evaporator. The sea water pipe 112 in the evaporator section *a* terminates to some distance upstream of the chimney 142 so that the water spraying or dripping from the pipe 112 has an opporunity to fall into the stream 144 flowing along the bottom of the evaporator before being swept into the chimney 142 by the current of air passing therethrough. The chimney 142 is also preferably provided with a wire mesh demister 146 of a conventional construction, or other suitable filter, for removing any entrained sea water which might possibly be contained in the air entering the chimney before such air enters the body of the condenser 116.

The top portion of the chimney 142 extends upwardly through the bottom of a condenser sump or header 148. Connected to the header 148 and communicating with the interior thereof are a plurality of condenser tubes 150, 150 which extend upwardly at an inclined angle and are preferably arranged in a relatively compact bundle. At their upper ends the tubes 150, 150 enter and communicate with the interior of another header 152 which in turn communicates with an exhaust duct 164. Associated with the exhaust duct 154 is a blower or exhaust fan 156 and a return duct 158 which conveys air from the blower 156 to the upstream end of the evaporator section *b*. Operation of the blower 156 causes air to be withdrawn from the evaporator section *a* through the chimney 142 and into the interior of the header 148. From the header 148 the air is drawn upwardly through the condenser tubes 150, 150 into the header 152 and through the exhaust duct 154 to the blower 156 where it is discharged through the return pipe 158 to the next evaporator section *b*. As it flows upwardly through the condenser tubes 150, 150 the humidified air is cooled by the water sprayed on the tubes from the spray head 122. This cooling of the air passing through the pipes 150 causes the water vapor therein to condense in the tubes and the condensed water so formed drains from the tubes into the bottom of the sump 148 from whence it is conducted by the associated fresh water line 118 to a desired point of use.

As mentioned, the sea water used for cooling and supplied by each spray head 122 is preferably taken from the ocean and conducted to the spray head by a separate pipe 120 running parallel to the evaporator 114. This pipe 120 is preferably covered with insulation as indicated at 160 so that the water therein is maintained at as low a temperature as possible and is not heated by the sun's rays. The water which is sprayed onto the condenser tubes 150, 150 from the spray head 122 is collected in a trough 162 located below the tubes 150, 150 and is conducted from the trough to the sea water pipe 112 of the next evaporator section *b* by the line 132. If desired, a pump 166 may be placed in the line 132 so that the water delivered to the sea water pipe is supplied thereto under some pressure. As is passes over the outside of the condenser tubes 150, 150 the water from the spray head 122 absorbs heat therefrom so that this water as it enters the sea water pipe of the evaporator section *b* contains some amount of preheat.

In order to assure proper withdrawal of the humidified air from the evaporator section *a* means are provided for preventing the air from the evaporator section *a* from passing to the evaporator section *b* without first passing through the condenser 116. In the present instance this means consists of a baffle or plate 168 positioned within the body of the evaporator 114 some distance downstream from the chimney 142. The baffle 168 closes the entire upper portion of the evaporator body and has a lower end which is immersed in the stream 144 but spaced some distance above the bottom of the evaporator body to leave an opening 170 for the passage of the stream 144 past the baffle. The baffle 168 then by means of the opening 170 permits the stream 144 flowing along the bottom of the evaporator to pass directly from the evaporator section *a* to the evaporator section *b* and at same time prevents the humidified air in the upper portion of the evaporator body from passing directly between the two evaporator sections and instead makes it unnecessary for air in the evaporator section *a* to pass upwardly through the chimney 142 and into the condenser 116.

FIG. 13 illustrates a condenser 116 at a location where it is necessary to raise the elevation of the downstream section *b* of the evaporator 114 relative to the upstream section *a* in order to accommodate the evaporator to a natural rise in elevation of the land over which the evaporator extends or to provide increased elevation at the upstream end of the section *b* to allow the section to be placed on an incline so that water collecting in the bottom thereof will flow by gravity toward the other end. Referring to FIG. 13, the evaporator 114 there shown is substantially the same as that shown in FIGS. 11 and 12 except that the downstream section *b* is separate from the upstream section *a* and located at a level some distance above the downstream end of the section *a*, the downstream end of the latter section being closed by a closure plate 172. Associated with the downstream end of the section *a* is a chimney 142 and a condenser 116 which are similar to the corresponding parts shown in FIGS. 11 and 12 and need not be redescribed. The upstream end of the evaporator section *b* is closed by another closure plate 174 and passing through this plate is the line 132 which communicates with the sea water pipe 112 of the section *b* and the return air duct 158 which communicates with the interior of the section *b*. In the operation of the apparatus shown in FIG. 13 humidified air leaving the evaporator section *a* passes upwardly through the chimney 142, through the condenser 116, and by means of the blower 156 is drawn from the condenser through the exhaust duct 154 and conveyed upwardly through the return duct 158 to the interior of the evaporator section *b*. Spray water from the spray head 122 is collected in the trough 162 and pumped through the line 132 by the pump 166 to the spray water pipe 112 in the evaporator section *b*. In the construction shown in FIG. 13 the stream 144 forming in the bottom of the evaporator section is discharged through an outlet 176 to a suitable waste receiver and a new stream is formed in the evaporator section *b* by the water which sprays or drips from the sea water pipe 112 therein. If desired, however, the brine leaving the outlet 176 of the evaporator section *a* may be connected by a suitable pipe and pump to the evaporator section *b* for subsequent flow through said latter section. Also, if desired, the brine leaving the outlet 176 rather than the water from the trough 162 may be pumped to the sea water pipe 114 of the section *b* and the water from the trough either discharged to a waste receiver or conveyed to the interior of the evaporator section *b* for flow along its bottom.

From the above description of FIG. 13 it will therefore be evident that the illustrated apparatus provides a simple means whereby the elevation of the evaporator may be raised at the location of any one of the condensers. The elevation of the evaporator may also be changed at any point intermediate the condensers by providing suitable pump means for pumping the sea water and air from the lower to the higher elevation, but preferably changes in elevation are designed to occur at the condenser location since these changes can then be effected by using substantially the same equipment as would be used even if the elevation were not changed.

Referring again to FIG. 10 which illustrates the complete system, it will be noted that one of the advantages of this system is that it supplies fresh water at the outlets 118, 118 which are spaced at various points along the length of the evaporator and each of these outlets may be used to serve a given area or facility requiring fresh water. The fact that a plurality of condensers are used in the system also eliminates the possibility of a major breakdown as a result of the failure of one of the condensers, since if one of the condensers does fail it may be bypassed and the air which would normally flow through the condenser retained in the evaporator body for flow to the next condenser. It will also be noted that in the system shown in FIG. 10 the evaporator 114 serves both as an evaporator and as a transportation conduit for the fresh water with no separate pipe being required for delivering the fresh water from the beach to the various areas to be served.

*Desalination system of FIGS. 14 and 15*

In the general type of system shown in FIG. 10 employing an elongated evaporator and a number of condensers spaced along the length of the evaporator, various different schemes may be used for conducting air and sea water between and to the various evaporator sections, for utilizing the condenser cooling water, and for discharging the air and sea water from one or more points along the evaporator, and FIGS. 14 and 15 illustrate another system comprising another embodiment of the process and apparatus of the invention and which system is somewhat different from that of FIG. 10 in regard to such respects. Where applicable the same reference characters have been used in FIGS. 14 and 15 to indicate parts similar to those described in FIGS. 10 to 13 and no additional description of these parts will be made.

Referring to FIGS. 14 and 15, the system therein shown includes a sea water pipe 112 which extends the full length of the evaporator 114 and passes through the location of each condenser 116 so that all water sprayed or dripped from such pipe 112 is derived from the pump 110. The water which is sprayed on to each condenser 116 from the associated spray head 122 is not collected for use in the evaporator 114 but is instead discharged from the condenser through a pipe 136 into an associated disposal pit 138. Also, it will be understood that in the schematic illustration of FIG. 14 the spray heads 122, 122 have been shown for convenience as discharging sea water horizontally onto the associated condensers, whereas it is preferred that they discharge sea water in a generally vertical direction onto the condensers as shown and described in connection with FIG. 15.

Thus, referring to FIG. 15, in passing from the section a to the section b of the evaporator 114 the sea water pipe 112 passes through the baffle 168. The air in the section a, however, is prevented by the baffle 168 from passing directly in to the section b and is instead deflected upwardly through the chimney 142 and through the condenser 116 from whence it is subsequently returned by the ducts 154 and 158 and the blower 156 to the evaporator section b. The spray water from the spray head 122 is collected in the trough 162 and is discharged through the line 136 to the pit 138, while the fresh water produced in the condenser 116 is drained from the sump 148 by the fresh water line 118. Although FIG. 15 illustrates a situation where no change in elevation occurs between the two evaporator sections at the condenser location, it will be understood that a change in the elevation of the two sections may be made in substantially the same manner as shown in FIG. 13. As another alternative it is to be understood that the condenser cooling water rather than being discharged from the line 136 into the pit 138 may be discharged into the upstream end of the next adjacent evaporator section b for flow along the bottom of the evaporator.

Figure 16:
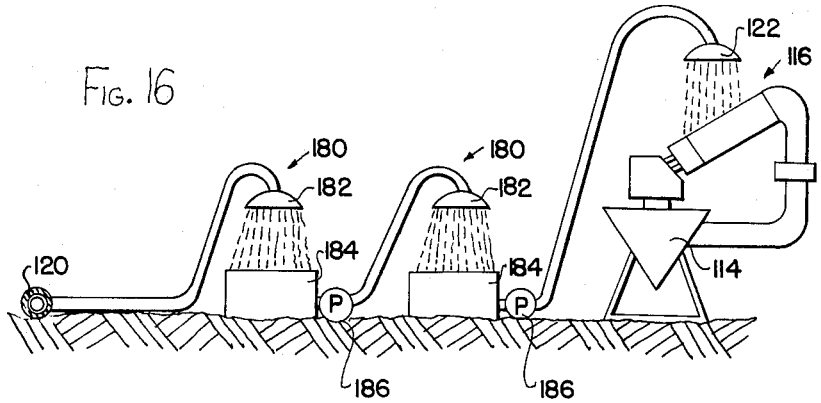
FIG. 16 is a schematic illustration of a means for precooling the sea water used as the cooling agent in the condensers of the systems of FIGS. 10 and 14.

*Evaporator means for precooling the condenser spray water—FIG. 16*

FIG. 16 illustrates schematically a means which may be used with either the system of FIGS. 10 to 13 or the system of FIGS. 14 and 15 for precooling the water used as the cooling agent for each of the condensers 116, 116.

Referring to FIG. 16, the illustrated means for effecting the precooling of the spray water includes two evaporator-type coolers connected in series and indicated generally at 180, 180. These evaporative coolers may take various different forms but as illustrated each includes a spray head 182 adapted to spray water supplied to the head into a receiver 184. As the water travels from the spray head 182 to the associated receiver it is cooled by evaporation and the water collected in the receiver is pumped by a pump 186 to the next associated spray head 182 or 122. Thus, the water from the sea water line 120 is subjected to two evaporative cooling effects before reaching the final spray head 122 and is therefore substantially reduced in temperature before it reaches the head 122 so as to have a greater cooling effect on the condenser 116. Although FIG. 16 shows two evaporative coolers by way of example, it is to be understood that the invention is not limited to this number of coolers and that one or any other number of coolers could be used if desired in association with each condenser.

The invention claimed is:

1. A desalination system for converting sea water taken from a given source thereof into fresh water, said system comprising an evaporator comprising an elongated hollow evaporator body exposed to the sun's rays so as to be heated thereby and inclined along its length relative to the horizontal so that water collecting in the bottom thereof will flow therealong by gravity, a sea water pipe located within said hollow evaporator body and running longitudinally thereof some distance above its bottom, means for withdrawing sea water from said sea water source and for introducing the same into said sea water pipe, said sea water pipe having openings in the wall thereof so that water contained therein may pass through the wall thereof and fall through the body of said evaporator to the bottom thereof for subsequent flow along said bottom, means for introducing air into said evaporator body for flow therethrough in contact with said sea water so that water vapor may evaporate from said sea water into said air to produce humidified air as a result of heat received from said evaporator body, a condenser utilizing the sea water of said source as a cooling agent, and means for withdrawing said humidified air from said evaporator body and for conducting the same to said condenser for flow therethrough to condense water vapor from said air for use as fresh water.

2. A desalination system for converting sea water taken from a given source thereof into fresh water, said system comprising an evaporator comprising an elongated hollow evaporator body exposed to the sun's rays so as to be heated thereby and inclined along its length relative to the horizontal so that water collecting in the bottom thereof will flow by gravity toward the lower end thereof, a sea water pipe located within said hollow evaporator body and disposed longitudinally thereof some distance above its bottom, means for withdrawing sea water from said source and for introducing the same into said sea water pipe, said sea water pipe having openings in the wall thereof so that water contained therein may pass through the wall thereof and fall through the body of said evaporator to the bottom thereof for subsequent flow along said bottom, means for introducing air into said evaporator body for flow therethrough in contact with the sea water falling from said sea water pipe and flowing along the bottom of said evaporator body so that water vapor may evaporate from said sea water into said air to produce humidified air as a result of heat received from said evaporator body, a condenser located in said source of sea water so as to be cooled thereby and including a sump for collecting the condensate produced in the condenser, means for withdrawing said humidified air from said evaporator body and for conucting the same to said condenser for flow therethrough to condense water vapor from said air, and means for withdrawing said condensate from said sump for use as fresh water.

3. A desalination system for converting sea water taken from a given source thereof into fresh water, said system comprising an evaporator comprising an elongated hollow evaporator body exposed to the sun's rays so as to be heated thereby and inclined along its length relative to the horizontal so that water collecting in the bottom thereof will flow by gravity toward the lower end thereof, a sea water pipe located within said hollow evaporator body and running longitudinally thereof some distance above its bottom, means for withdrawing sea water from said source and for introducing the same into said sea water pipe, said sea water pipe having openings in the wall thereof so that water contained therein may pass through the wall thereof and fall through the body of said evaporator to the bottom thereof for subsequent flow along said bottom, means for introducing air into said evaporator body for flow therethrough in contact with the sea water falling from said sea water pipe and flowing along the bottom of said evaporator body so that water vapor may evaporate from said sea water into said air as a result of heat received from said evaporator body, a condenser located in said source of sea water so as to be cooled thereby and including a sump for collecting the condensate produced in the condenser, means at the lower end of said evaporator for separating said humidified air from the sea water flowing along the bottom of the evaporator, means for conducting the separated humidified air to said condenser for flow therethrough to condense water vapor from said air, means for withdrawing said condensate from said sump for use as fresh water, and means utilizing said separated sea water to heat the sea water introduced to said sea water pipe.

4. A desalination system as defined in claim 3 further characterized by said means for utilizing said separated sea water to heat the sea water introduced to said evaporator including a heat exchanger through which said separated and introduced sea water flow in heat exchange relationship.

5. A desalination system as defined in claim 3 further characterized by said means for utilizing said separated sea water to heat the sea water introduced to said evaporator including means for mixing a portion of said separated sea water with said introduced sea water.

6. A desalination system for converting sea water taken from a given source thereof into fresh water, said system comprising an evaporator comprising an elongated hollow evaporator body exposed to the sun's rays so as to be heated thereby and inclined along its length relative to the horizontal so that water collecting in the bottom thereof will flow therealong by gravity, means for withdrawing sea water from said source and for introducing the same into said evaporator body for flow along its bottom, means for introducing air into said evaporator body for flow therethrough in contact with said sea water so that water vapor may evaporate from said sea water into said air to produce humidified air as a result of heat received from said evaporator body, a condenser located adjacent said evaporator at a point located intermediate the ends of said evaporator body, an air outlet in the upper portion of said evaporator body and located near said condenser, a baffle in said evaporator body located downstream of said air outlet which baffle closes the entire upper portion of said evaporator body and extends downwardly with its bottom edge immersed in the water flowing along the bottom of said evaporator but spaced from said bottom so as to leave an opening for the passage of said water beyond said baffle, means for withdrawing said humidified air from said evaporator body through said air outlet and for conducting the same to said condenser for flow therethrough to condense water vapor from said air, and means for returning the withdrawn air to said evaporator body at a point located downstream of said baffle after said air has passed through said condenser.

7. A desalination system for converting sea water taken from a given source thereof into fresh water, said system comprising an evaporator comprising an elongated hollow evaporator body exposed to the sun's rays so as to be heated thereby and inclined along its length relative to the horizontal so that water collecting in the bottom thereof will flow therealong by gravity, a sea water pipe located within said hollow evaporator body and disposed longitudinally thereof some distance above its bottom, means for withdrawing sea water from said source and for introducing the same to said sea water pipe, said sea water pipe having openings in the wall thereof so that water contained therein may pass through the wall thereof and fall through the body of said evaporator to the bottom thereof for subsequent flow along said bottom, means for introducing air into said evaporator body for flow therethrough in contact with the sea water falling from said sea water pipe and flowing along the bottom of said evaporator body so that water vapor may evaporate from said sea water into said air to produce humidified air as a result of heat received from said evaporator body, a condenser located adjacent said evaporator at one point along its length, means for withdrawing said humidified air from said evaporator body and for conducting the same to said condenser for flow therethrough to condense water vapor from said air, and means for supplying sea water from said body thereof to said condenser for use as a cooling agent.

References Cited by the Examiner

UNITED STATES PATENTS

| | | |
|---|---|---|
| 614,776 | 11/1898 | Stocker. |
| 983,424 | 2/1911 | Brosius. |
| 2,018,049 | 10/1935 | Allen. |
| 2,249,642 | 7/1941 | Turner. |
| 2,332,294 | 10/1943 | Allen. |
| 2,383,234 | 8/1945 | Barnes. |
| 2,424,142 | 7/1947 | Bimpson et al. _____ 202—185.5 |
| 2,803,591 | 8/1957 | Coanda et al. _____ 202—234 |
| 2,843,536 | 7/1958 | Mount. |
| 2,893,926 | 7/1959 | Worthen et al. |
| 2,902,028 | 9/1959 | Manly. |
| 2,908,618 | 10/1959 | Bethon. |
| 2,959,524 | 11/1960 | Goeldner. |
| 3,015,613 | 1/1962 | Edmundson. |
| 3,088,882 | 5/1963 | Justice. |
| 3,142,381 | 7/1964 | Ria et al. _____ 202—173 |

FOREIGN PATENTS

| | | |
|---|---|---|
| 838,722 | 4/1952 | Germany. |
| 24,930 | 12/1956 | Germany. |

NOMAN YUDKOFF, *Primary Examiner.*

ROBERT F. BURNETT, GEORGE D. MITCHELL,
*Examiners.*

M. H. SILVERSTEIN, W. L. BASCOMB,
*Assistant Examiners.*